Dec. 15, 1970   H. J. WHITEHOUSE   3,548,306
SURFACE WAVE SPECTRUM ANALYZER AND INTERFEROMETER
Filed Aug. 29, 1968
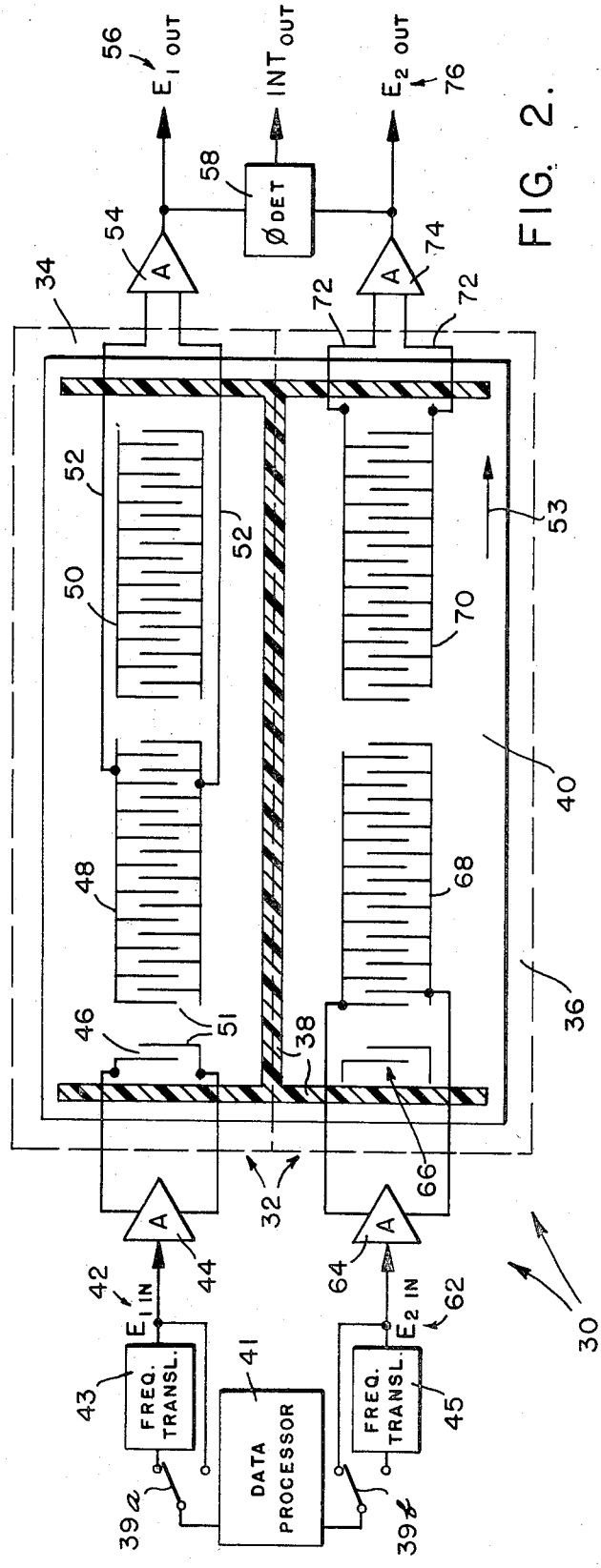
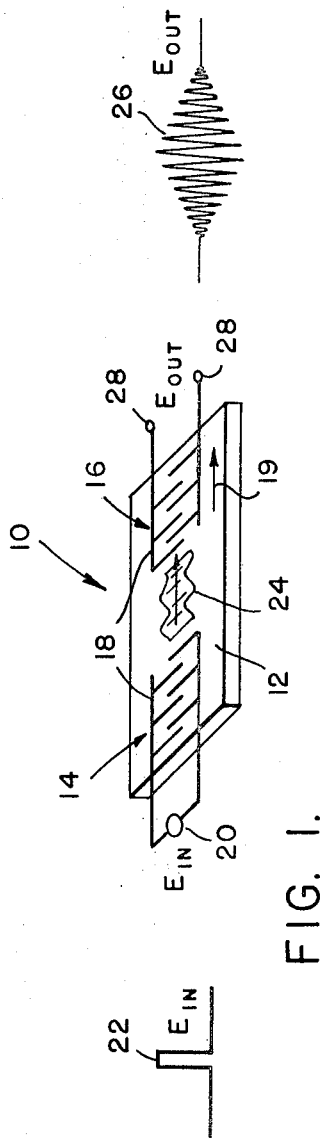
INVENTOR.
HARPER J. WHITEHOUSE
BY ERVIN F. JOHNSTON
ATTORNEY.
JOHN STAN
AGENT.

3,548,306
SURFACE WAVE SPECTRUM ANALYZER AND INTERFEROMETER

Harper John Whitehouse, Hacienda Heights, Calif., assignor to the United States of America as represented by the Secretary of the Navy
Filed Aug. 29, 1968, Ser. No. 756,242
Int. Cl. G01r 23/00, 23/12
U.S. Cl. 324—80
9 Claims

ABSTRACT OF THE DISCLOSURE

A distributed two-transducer non-dispersive acoustic wave device which enables simultaneous spectrum analysis and interferometry to be performed. Essentially, the device consists of a pair of transducer sets disposed in a parallel relation along the surface of a crystal substrate, each of the transducer sets forming a matched filter, or surface wave device. Each of two coherently related input signals traversing the surface wave devices of the distributed two-transducer non-dispersive acoustic wave device are amplified and form separate outputs, each of which can be analyzed for spectral content. Alternatively, both spectral outputs can be connected to a phase detector, thus permitting interferometry.

---

The invention described herein may be manufactured and used by or for the Government of the United States of America for governmental purposes without the payment of any royalties thereon or therefor.

In the field of spectrum analyzers and interferometers, it has been the general practice in the prior art to employ separate instruments to perform a spectrum analysis and interferometry. This could not be done in a compact device, as these prior art devices used a propagation of torsional waves along a magnetostrictive wire and sensing structure or apparatus in proximity to the sonic wire. Also, in prior art devices external circuitry or a constant-temperature oven had to be used in order to achieve differential stability.

Accordingly, the general purpose of this invention is to provide a distributed two-transducer-set, non-dispersive, acoustic wave device which permits the simultaneous operation of spectrum analysis and interferometry of two signals, one traversing what is termed an upper channel and the other traversing a lower channel.

The term "distributed transducer" implies that, in general, both the input and output transducers of each transducer set should be distributed devices, that is to say, physically distributed devices, as distinct from point transducers. The word "non-dispersive" has its usual connotation of a flat amplitude-frequency characteristic. To attain the objective of this invention, the present invention contemplates a unique, compact, acoustic wave device comprising a crystal substrate in the form of a plate upon which are deposited interfingered or interdigitated electrodes. Each set of transducers forms a matched filter at the input of one of which, for the specific implementation chosen, appears a digitized input signal, while at the other matched filter appears an analog signal.

In the device of this invention, each transducer set includes a set of interdigitated metallic electrodes which are deposited along the axis of a single crystal of AT-cut quartz. The transducers of each set are related in the sense that the output signal of each transducer set is the convolution of the spatial response of the first transducer of the set with the second transducer of the set while the pair of transducer sets are spatially related in the sense that a phase angle between the impulse responses of the first and second channels are related by the spatial position of the transducers. These electrodes produce an acoustic surface wave which propagates from an input set of electrodes to an output set of electrodes along the digonal axis, in accordance with the theory of Coquin and Tiersten, Journal of the Acoustical Society of America, vol. No. 41, No. 4, pp. 921–939, April 1967— Part 2. The resulting output voltage is the triple convolution of the input signal with the response of the first transducer of a set with the response of a second transducer of the same set, where any transducer along the digonal axis may be considered as an input transducer and any other transducer positioned in the same line or array as the first transducer may be considered an output transducer.

In the invention, each set of transducers may consist of three separated transducers in a linear array, the electrodes of the first transducer, designated 1a, consisting of a single pair of interdigitations while the electrodes of the other two transducers designated, 1b and 1c, have an equal number of interdigitations, greater than one. If the input is applied to transducer 1a and the output taken from transducer 1b, adjacent to 1a, or transducer 1c, the output will be that portion of the spectrum of the input in a frequency band 1 length (in seconds) of the output transducer. If the input signal is stored and shifted slightly up or down in frequency by conventional means and applied again to the device, that portion of the spectrum occurring at a frequency difference equal to the shift distance will be measured, etc. However, in accordance with Fourier Theory, spurious outputs will be down only 13 db at their first occurrence.

If however, the input is applied to transducer 1b and the output is taken from transducer 1c, operation will be as before but the first spurious output will be down 26 db. When a phase detector is connected between outputs of each set of transducers, an interferometer is formed which has an output simultaneous with the outputs of the spectrum analyzer. Differential temperature stability is assured since the related spectrum analyzers have the same thermal response, inasmuch as both spectrum analyzers have as an integral element the same single crystal substrate.

A spectrum analysis of the signals traversing the channel of either transducer set may be taken alone. These are respectively the input signals to the phase detector and they may be analyzed by comparing them against a threshold circuit, with a spectral component being present when the output of either of the signals exceeds the threshold level.

Accordingly, an object of the present invention is the provision of an acoustic wave device which permits simultaneous spectrum analysis and interferometry.

Another object is to provide an acoustic wave device with differential temperature stability previously unattainable in uncompensated or thermally uncontrolled equivalent devices.

Still another object is to provide a means for spectrum analysis and interferometry without the need for external circuitry or a constant temperature oven in order to achieve differential temperature stability.

A further object of the invention is the provision of a means for spectrum analysis and interferometry in a single small thermally insensitive device fabricated from a single piezoelectric crystal.

Yet another object of the present invention is the provision of an interferometer which may be used even when one of the input signals is a sequence of pulses.

Other objects and many of the attendant advantages of this invention will be readily appreciated as it becomes better understood by reference to the description and accompanying drawings which follow.

FIG. 1 is a partially diagrammatic view of an acoustic wave device comprising a single set of two transducers.

FIG. 2 shows an embodiment of the distributed two-transducer pair acoustic wave device of this invention and its connection to associated equipment for spectrum analysis and interferometry.

Referring now to the drawings, wherein like referenced numerals designate like or corresponding parts throughout the several views, there is shown in FIG. 1, which illustrates a simplified embodiment of the invention, a distributed transducer pair, a non-dispersive acoustic wave device 10, including a substrate consisting of an AT-cut quartz crystal plate 12, upon which are deposited, by a photo-etching process, a pair of transducers, an input transducer 14 and an output transducer 16. The transducers include interdigitated electrodes 18, made of aluminum, for example, and deposited preferably along the diagonal axis 19 of the AT-cut quartz plate. The interdigitated electrodes 18 are spatially distributed and when an electrical impulse 22 is applied to the spatial input transducer 14, the electrical output signal 26 becomes a spatial response. The term "spatial response" implies a function of time which corresponds to a function of position.

In general, the numbers of interdigitations in the input and output transducers 14 and 16 need not be equal. In the particular embodiment shown in this illustration they are equal in that it is desired to produce a triangular pulse response. If however, the number of elements or interdigitated electrodes 18, in each of the transducer patterns were unequal, the triangular response 26 would reduce to a trapezoidal response which, in the limit of complete asymmetry, with only one element in the input transducer, the other more numerous elements in the output transducer would result in a constant-amplitude rectangular output pulse.

With respect to the dimensions of the interdigitations, the width of the electrode should be equal to the width of the space between two adjacent electrodes. If one interdigitation is considered to consist of two "up" lines and one "down" line, the width of the interdigitation should be equal one wave length of the signal, where the wavelength and frequency when multiplied together equal the velocity of propagation of the wave on the material. In this case, the velocity is close to 3,000 meters per second on quartz. Thus, as an example, we see that lines of 2 mils width with spaces between them of 2 mils will produce an operating frequency of the transducer of around 1.5 to 1.6 megahertz (mHz.).

Referring now to FIG. 1, an input signal generator 20 generates an analog-type electrical signal 22, designated $E_{in}$, which is transduced by the input transducer 14 into an acoustic surface wave 24. The acoustic surface wave 24, in turn, is transduced by output transducer 16 into an electrical output signal 26, which appears at the output terminals 28.

As may be seen from FIG. 1, the electrical output signal 26, designated $E_{out}$, has a triangular envelope if the length of the input transducer 14 is equal to the length of the output transducer 16, as is the case in the embodiment shown in FIG. 1. If, however, one transducer is longer than the other, then the amplitude of the output signal will increase linearly and remain at a constant amplitude for a duration in cycles equal to the difference in length between the input and output transducer and then linearly return to zero. The acoustic surface wave 24 is shown as a finite series of sinusoidal pulses, the form of the surface wave being a function of the electrical input signal 22 and of the number and spacing of the electrodes forming the input transducer 14.

Referring now to FIG. 2, there is shown a surface wave spectrum analyzer and interferometer 30, including a distributed transducer non-dispersive acoustic wave device 32. The acoustic wave device 32 consists of an upper channel surface wave device 34 and a lower channel surface wave device 36, separated by absorptive isolator stripping 38. Both the surface wave devices 34 and 36 which also serve the functions of matched filters, are oriented along the diagonal axis of a crystal substrate 40 consisting of an AT-cut quartz crystal, in a preferred embodiment.

In the spectrum analyzer and interferometer 30, two signal paths or channels are employed, an upper channel traversing the upper surface wave device 34 and associated equipment, and a lower channel traversing the lower surface wave device 36 and associated equipment. It is the combination of the signals from the two channels which enables interferometry to be performed, that is, the combination of the two signals enables determination of the phase relative to each other of the input signals.

An electrical signal $E_{1\ in}$, labeled 42, from the data processor 41, whose function is more fully described hereinbelow, is amplified by an amplifier, termed the upper channel input signal amplifier 44, and then fed to an upper channel input transducer 46, thereby producing an acoustic surface wave (not shown) in the upper channel surface wave device 34. The frequency translators 43 and 45 are inserted into the signal paths by switches 39a and 39b when the spectrum analyzer and interferometer 30 is to be used over a relatively broad band of frequencies. The produced acoustic surface wave is then detected by an upper channel intermediate transducer 48 and transduced to an electrical signal.

In the upper channel surface wave device, or matched filter 34, a transducer 50, rather than the upper channel intermediate transducer 48, could be used as an output transducer for some applications. In the embodiment shown, the upper channel transducer 50 is not used. However, since this device can be used in applications where both channels may require amplitude information, one of the features of the transducer configurations, is that by a simple reconnection of the transducers in a set, that is, by simply transferring a connection on the photoengraved pattern comprising the electrode structure, one may fabricate, with a single photo mask, embodiments wherein either both channels are amplitude-weighted, or one channel or the other is amplitude-weighted or neither channel is amplitude-weighted.

The transduced signal generated by the upper channel intermediate transducer 48 is fed by electrical leads 52 into an upper channel output signal amplifier 54. The amplified upper channel output signal $E_{1\ out}$, labelled 56, is fed into a phase detector 58, which performs the operation of interferometry.

Discussing now the signal path of the lower channel surface wave device 36, a signal $E_{2\ in}$, labelled 62, coming from the data processor 41, and which is coherently related to $E_{1\ in}$, is amplified by a lower channel input signal amplifier 64 and is fed into the lower channel intermediate transducer 68, serving as an input transducer. The output from input amplifier 64 is not fed to the lower channel transducer 66 because an amplitude-weighted output signal is desired. The lower channel intermediate transducer 68 transduces the electric signal into an acoustic surface wave (not shown). The acoustic surface wave is detected by a lower channel output transducer 70 and transduced to an electrical signal which is fed by leads 72 into a lower channel output signal amplifier 74. The output 76 labelled $E_{2\ out}$, of amplifier 74 is also fed to phase detector 58 and combined with the upper channel output signal 56, $E_{1\ out}$, thereby producing an interferometric pattern.

In order that the acoustic wave device 32 operate as described, it has been postulated that a single surface wave travels in each surface wave device 34 and 36 from left to right across the quartz plate or crystal 40. Since each transducer itself is bilateral and can launch waves in which half the energy is going toward the right and half toward the left, the strips of the isolator stripping 38 at either end of the crystal 40 absorb the unwanted acoutsic energy so that a refletcion will not take place off the edge of the crystal at either the left-hand launch end or at the right-hand receive end. In addition, there is a strip down the center of the crystal plate 40 between the pair of surface wave devices 34 and 36, preventing minor lobe radiation from the upper transducers from being received as a spurious signal in the lower transducers, and vice versa, this strip, therefore, also serving as an attenuator. Cross talk and other interference effects may also be avoided by use of the absorptive isolator stripping 38. Light grease may be used as an absorptive isolator stripping 38.

The phase detector 58, while in principle being a linear device, is normally implemented in the form of two hard limiters followed by a modulo-2 adder (Not shown in FIG. 2). A hard limiter is essentially a threshhold device which provides an output signal of zero whenever the input signal is negative and provides an output of a certain amplitude whenever the input signal is positive, thus the state of a hard limiter changes whenever the input signal passes through zero. A modulo-2 circuit, commonly known as a modulo-2 adder, is a half adder or exclusive-OR circuit and is a digital equivalent of an analog multiplier. It has the property that, if two binary signals A and B are applied to the modulo-2 circuit, there is an output only when an A or B is present, but unlike the conventional OR circuit, the exclusive-OR does not have an output when an A or B are present simultaneously at the input to the modulo-2 adder. Thus, the actual output from the phase detector is a DC level, through integration of the digital signals at its input, though the source of these signals would be analog in one channel, and digital in the other channel. It is essentially the zeroes, that is, the times that the signal passes through zero, that are important to the performance of the phase detector, not the amplitude of the individual signals.

In FIG. 2, the upper channel is rectangularly weighted and the lower channel is triangularly weighted. Of course, in the two channels the transit times of the signals must have durations appropriately determined so that the spectral responses of these two signals are the same, in which case then phase comparison can be made between a digital or essential unilevel signal transiting the upper channel and an analog signal transiting the lower channel.

While the distributed two-transducer non-dispersive acoustic wave device 32 is capable of handling various types of input signals 42 and 62, a specific embodiment is illustrated in FIG. 2 wherein the signals traversing the upper channel surface wave device 34 are digital signals, while the signals traversing the lower channel surface wave device 36 are analog signals. Moreover, in the embodiment illustrated in FIG. 2, both types of signals are first time-compressed in a data processor 41.

In practice, the inputs 42 and 62, $E_{1\ in}$ and $E_{2\ in}$, in both channels could be digital signals. However, spurious spectral responses occur in digital systems which are not followed by carefully designed and appropriately placed filters. At the same time, energy normalization of the input signal and strong-signal capture, well known in the statistical signal detection, also occur. For this reason, the lower channel is concerned with analog signals while the upper channel handles digital signals.

In another type of application, both input signals 42 and 62 could be analog signals. Particularly, when all input signals are analog-type signals, more than one pair of transducer sets may be employed. Thus, the location of a radiation source, for example, a star, producing the incoming frequencies would be facilitated, inasmuch as the scaning operation would be divided into two units.

While the data processor 41 may not be considered as a part of this invention, the wide variety of the types of input signals which may be processed by the distributed transducer acoustic wave device 32 are important to the understanding of the invention. In order to use a high-bandwidth, high-frequency device, such as the distributed transducer acoustic wave device 32, which may also be considered a surface wave processor, in a system which has inherently a low-bandwidth, low-frequency signal, one must perform an operation upon an input signal which shortens its duration and increases its bandwidth. This operation is called time compression. In order to perform an operation of time compression, a signal must, in general, be stored in some form of memory and taken out of memory at the new rate, corresponding to the time compression ratio. Since almost all current memory systems store only binary information, it is necessary, first to take the analog input signal; secondly, it is necessary to sample the analog input signal and quantize it so that a binary word is generated, the numerical value of the binary word being proportional to the level or amplitude of the signal at the time that it was sampled or measured. This word, after having been stored in the time compressor 41, is fed into and processed by the distributed transducer acoustic wave device 10, of FIG. 1, or 32 of FIG. 2, and then converted back to analog by a digital-to-analog converter, which may be included in the phase detector 58.

Discussing now alternate materials for the acoustic wave device 32, other piezoelectric crystals, as well as ferroelectric crystals, besides the quartz crystal 40 may be used. Of the piezoelectric crystals, tourmaline, cadmium sulfide and zinc oxide may be used. Of the ferroelectric materials, lithium niobate as well as ammonium dihyrogen phosphate (ADP) may be chosen.

However, having chosen quartz for use as a substrate, the type of cut chosen is quite significant, in that the elastic constants of quartz vary with temperature so that, by properly orienting the crystal, one may choose the cut in such a manner that the thermal expansion of the quartz crystal is exactly equal and opposite in effect to the softening of the elastic constant with temperature, so that the time it takes a signal to transit the crystal is independent of the temperature. In electronics the AT-cut is known as a temperature-stable cut. The word "softening" is used to describe the reduction in the magnitude of the elastic modules; as the modulus decreases it becomes more like materials which we know as being soft. However, other orientations of the crystal may be used besides the digonal axis.

With respect to the material of which the electrodes themselves may be constructed, many other materials besides aluminum may be used to form the electrodes. Typical conductors which may be used because they are easily deposited are copper, gold and silver. In addition to the elemental conductors, there are compound conductors whose conductivity may be varied, either by doping or by illumination, such as cadmium sulfide, tin oxide and other materials of this class.

The interdigitated electrodes 18 or 51 may be produced by a lithographic process, a form of photo-lithography being used. An image originally on some kind of metal plate or glass film is used to expose a photo-resistant surface. This surface, when exposed to an etching solution removes the unwanted aluminization or other metalization with which the plate has been covered, leaving behind the desired electrode pattern.

Other materials which may be used for the absorptive isolator stripping 38 could be an oil or even some liquids. In addition, soft and pliant materials, such as some polymerized plastics or viscous rubbers such as silicone rubbers, may be used.

The range of operating frequencies over which this device can be used depends somewhat upon the type of crystal substrate which is used. From the crystalline implementation, one would anticipate that lower frequencies would be a few megahertz to upper frequencies in the range of a few kilomegahertz, while if, instead, one substituted at the low frequency polycrystalline ferroelectrics such as barium titanate or other such materials one might be able to extend the usefulness of the acoustic wave device 32 down into the region of hundreds of kilohertz, while the upper end, because of scattering from within the material, would probably be limited to something in the 10 to 100 mHz. frequency range.

Discussing now the mathematical operation termed convolution and its relation to this invention, convolution is the linear operator which describes a system which is characterized by an impulse response. The impulse response is the output of the system when a Dirac delta pulse is applied at its input at one instant in time. The total system performance is the input signal considered as discrete Dirac delta functions, each delta function producing an impulse response, the totality of the response being the delayed and weighted sum of the responses from each individual impulse corresponding to the input. This operation is the convolution of the input signal with the impulse response of the device.

The convolution of a point function with a distributed function always produces simply the distributed function. In the case where only the single transducer, upper channel input transducer 46 is used against the distributed transducer, upper channel intermediate transducer 48, the impulse response is rectangular and the spectral distribution is sin $x/x$. The spurious output is related to the Fourier transform of the impulse response, the first spurious or minor lobe being down only 13 db. In the lower channel of FIG. 2, a distributed transducer, lower channel intermediate transducer 68, is shown against a distributed transducer, lower channel output transducer 70. Since the operation is convolution, one distributed transducer convolved with another distributed transducer is the convolution of the envelope of the first one, which is rectangular, and of the envelope of the second one, which is also rectangular, and the convolution of two rectangles is a triangle, and therefore the impulse response of the lower channel surface wave device 36 is triangular. Since the Fourier transform of a triangular signal is the quantity $\sin^2 x/x^2$, the first minor lobe is down 26 db.

With respect to the operating frequency, a distributed-transducer acoustic wave device may, in principle, be designed to operate at a wide range of frequency. If one were to use polycrystalline material, the range of operation would be in the few hundred kilohertz up to only a few megahertz due to the scattering losses of the polycrystalline material. However, when one changes to a single-crystal material, then one is limited to frequencies from a few megahertz to a few hundred megahertz. However, current research indicates that operating frequencies may be extendable to microwave frequencies of a few gigahertz.

By means of direct piezoelectric generation of surface waves along the diagonal axis of AT-cut quartz, a 10 $\log_{10}$ ($2x$ time-bandwidth) product of 30 db. should be realized at 8 megahertz with $\sin^2 x/x^2$ distribution and a $-26$ db. first minor lobe. The significance of the 8 mHz. operating frequency at which the time-bandwidth product can be realized is that it is a figure of merit, in that it represents a decrease in time, actual real time, required to process an input signal. The higher the frequency at which a system can be realized, the more times the input signal can be played back to the same device or the same device can be time-shared over more input signals, since these processors are used sequentially to process the input signal over and over again.

Discussing now more fully the theory behind the mode of operation of the distributed two-transducer non-dispersive acoustic wave device of this invention, any linear system device such as the device of this invention can be described by its impulse response. In standard terminology, the impulse response is that function which has the form of the output when the input signal is the Dirac delta function. If one pulse, that is the delta function, is applied to the input of such a device and then the output signal is examined, that is the same information one could have gotten had one put successively different sine wave frequencies into the device and measured the frequency response. According to Fourier theory, the impulse response and the transfer function, that function measured by passing successively different sine waves through the device and measuring their amplitude, are related in that the impulse response and the transfer characteristics are Fourier transforms of each other.

In regard to the transfer characteristics of the acoustic wave device having the interdigitations shown in FIGS. 1 and 2 as mentioned hereinabove, by linear system analysis it can be shown that the output of a device such as the device of this invention is equal to the triple convolution of the input signal with the spatial response of the first transducer with the spatial response of the second transducer. The convolution can be performed in any order, that is, the convolution is a commutative function.

If this acoustic wave device 32 is to be used for spectrum analysis, the triangularly weighted channel in the lower channel surface wave device 36 would preferably be used, as it is in this channel that apodization, that is, attenuation of the minor lobes, of the transfer function of the device occurs. Triangular weighting is applied in order that minor lobe spectral responses will not occur until they are at least 26 db. below the main, major lobe, response. It would be when an output occurs in this lower analog channel that the presence of a spectral line has been detected. The upper channel surface wave device 34 could in principle also simply have a detector (not shown) placed in its output, in the position of the phase detector 58, to measure the amplitude of the signal traversing the upper channel, and the same spectral line could be detected but because of the rectangular weighting in the upper channel one would observe, also, a response at a slightly different frequency only 13 db. down from the main response. In most applications this is not sufficiently discriminatory in order to determine uniquely that a line is present, because one would not be able to tell whether this response 13 db. down was simply an image frequency caused by the filtering action of the upper channel surface wave device 34 or whether it actually existed as a spectral line at another frequency differing by that amount from the main signal.

In the embodiment shown in FIG. 2, each surface wave device 34 and 36 of the acoustic wave device 32 provides a function corresponding to a filter in a spectrum analyzer system. In order to take an input signal of unknown frequency and actually determine its frequency by use of one channel only of the acoustic wave device 32, additional electronics, as shown in FIG. 2, are required in a conventional configuration, since the output from the data processor 41 now becomes an unknown frequency. The pattern on the surface wave device 34 or 36 determines a known frequency, since it is a function of the spacing of the interdigitated electrodes 51, and when this known frequency is at the same, or very nearly the same, frequency as the input signal 42 or 62, an output signal 56 or 76 will be obtained which will be large relative to either zero or to a fixed threshold and thus it can be said that the input signal has been detected at that frequency.

In order that a single channel of the acoustic wave device 32, however, may be used to operate across a broad band of possible input frequency locations, an additional piece of equipment must be installed between the data processor 41 and the input to the acoustic wave device. This device is a simple frequency translator 43 and 45, which may be, for example, a single sideband modulator, which takes the unknown input signal 42 or 62, mixes it against a known local oscillator frequency in much the same manner as a superheterodyne receiver does. The local oscillator is then varied in time, trying successively different frequencies until an output from the surface wave device 34 or 36 is observed. Now, knowing the frequency determined by the surface wave pattern and the frequency of the local oscillator which causes the surface wave pattern to be generated, it is known that the frequency at the input to the surface wave device 34 or 36 is either the sum of these two frequencies or its difference, depending upon how the frequency translator 43 or 45 is constructed.

The interferometry part of the operation involves the comparison of the phase of the signals in the two channels. It should be noted that if it were not for the necessary storage purposes in the data processor 41, in the embodiment illustrated, the best performance of the interferometer is achieved when both channels are operating in the variable amplitude or analog mode, and, furthermore, for an ideal configuration it is desirable that both channels be identically constructed. It is still proper, though, to say that interferometry obtains even when one of the channels is binary. It is not necessary, however, that either of the signals traversing a channel be binary in order to have interferometry.

Obviously many modifications and variations of the present invention are possible in the light of the above teachings. It is therefore to be understood that within the scope of the appended claims the invention may be practiced otherwise than as specifically described.

What is claimed is:

1. A distributed-transducer acoustic wave device comprising:
   a crystal substrate, capable of propagating an acoustic surface wave;
   a pair of transducer sets mounted in a parallel relationship upon the crystal substrate;
   each transducer set including at least an input transducer and an output transducer;
   each transducer of each set including at least a pair of interdigitated electrodes, alternate members of which are connected together at one of two ends, the distance between each pair of adjacent electrodes for each transducer being uniform, the electrodes being disposed perpendicularly to the direction of surface wave propagation; and
   isolator stripping, disposed at each end of the substrate and between each set of transducers, to absorb unwanted surface wave reflections.

2. The distributed transducer acoustic wave device as recited in claim 1, wherein:
   the crystal substrate is made of quartz.

3. The distributed transducer acoustic wave device as recited in claim 1, wherein:
   the electrodes are made of aluminum.

4. The distributed transducer acoustic wave device as recited in claim 1, wherein:
   in a transducer set, the input and output transducers have an equal number of electrodes.

5. A distributed-transducer acoustic surface wave device, adapted for connection to an input electrical signal, comprising:
   a crystal substrate, capable of propagating a surface wave;
   a pair of transducers disposed side by side in an aligned relationship upon the crystal substrate, including an input and output transducer, each of which includes at least one pair of interdigitated electrodes disposed perpendicularly to the direction of surface wave propagation caused by the application of the input signal to the input transducer, the output transducer preferably having the same number of electrodes as the input transducer, the distance between each pair of adjacent electrodes for each of the transducers being uniform and such that the frequency determined by the spacing is approximately that of the input signal;
   absorptive stripping disposed at each end of the substrate, to absorb unwanted surface wave reflections; and
   a signal detector connected to the output transducer, for detecting the presence of a frequency component in the input signal which matches the frequency as determined by the electrode spacing of the input and output transducers.

6. A surface-wave device according to claim 5, further comprising:
   a frequency translator connected to the input transducer, whose output frequency may be varied, so that its output signal mixes with the input signal to produce a sum or difference frequency which propagates across the surface of the substrate and the two transducers and may be detected by the signal detector when the sum or difference frequency matches the frequency as determined by the electrode spacing of the transducer.

7. A surface wave device according to claim 5, further comprising:
   a second pair of transducers substantially identical to the first pair, disposed on the substrate in a parallel relationship to the first pair, so that, upon application of an input signal to the input transducer of the second pair, surface wave propagation is caused across the surface of the substrate parallel to the first-named direction; and wherein,
   the signal detector is a phase detector having two inputs, one of each of which is connected to the output transducer of each of the two transducer pairs, so that, upon application of input signals to both input transducers, the phase detector will generate an output signal if the frequencies of both input signals are substantially identical.

8. A surface wave device according to claim 7, further comprising:
   a frequency translator, whose output frequency may be varied, connected to the input transducer of one of the transducer pairs, so that with an input signal at the input transducer of the other pair of transducers, the two signals, the one generated by the frequency translator and the input signal, traverse the surface of the substrate to the phase detector, which generates an output signal if there are any common frequencies in the two signals.

9. A surface wave device according to claim 8 further comprising:
   a pair of input amplifiers connected to the input transducers for amplifying the input signals;
   a pair of output amplifiers, connected to and located between the output transducers and the two inputs to the phase detector.

References Cited

UNITED STATES PATENTS 3,376,572   4/1968   Mayo _____ 330—30X
3,444,482   5/1969   Becker _____ 330—30X ALFRED E. SMITH, Primary Examiner U.S. Cl. X.R.

324—77, 82; 333—30